Aug. 2, 1932.    L. D. SOUBIER    1,869,921
MEANS FOR FEEDING MOLTEN GLASS
Filed Oct. 14, 1929
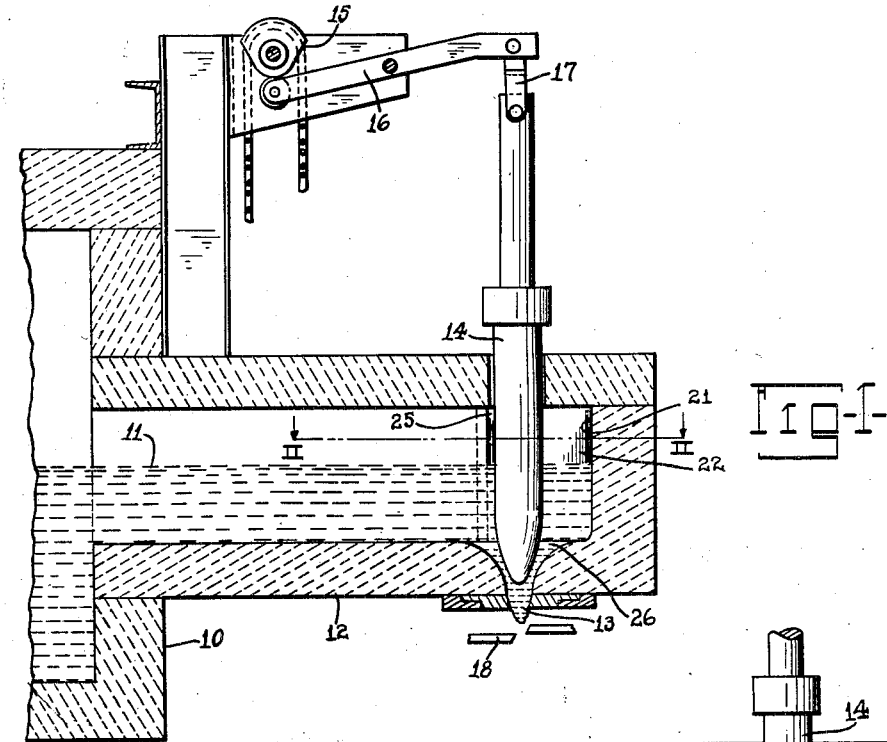
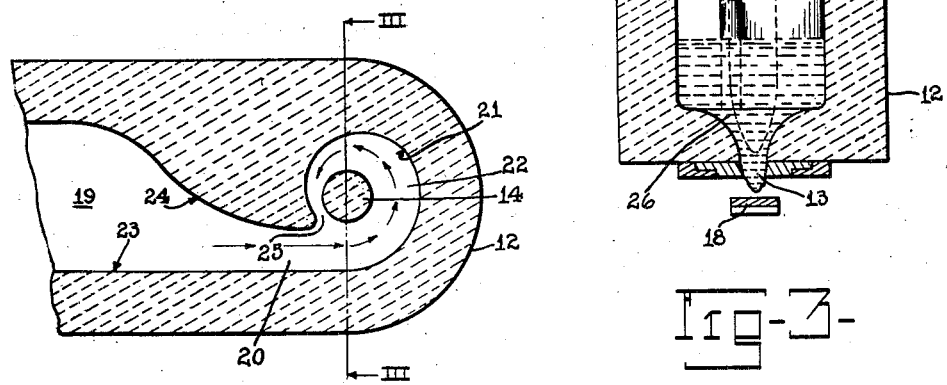
Inventor
Leonard D. Soubier,
By J. F. Rule, Attorney Patented Aug. 2, 1932

1,869,921

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

MEANS FOR FEEDING MOLTEN GLASS

Application filed October 14, 1929. Serial No. 399,461.

This invention relates to feeding molten glass and forming it into mold charges suitable for the molds of a forming machine. More particularly, it relates to glass feeding apparatus of the type in which the glass is discharged through a bottom outlet in the floor of a container, the flow being controlled by a suitable implement operating in the glass above the outlet, and further relates to a novel method of directing and controlling the movement of the molten glass.

An object of the invention is to provide a novel method and means for causing a circulation of glass in a manner to insure homogeneity and uniform temperature of the issuing glass and to prevent stagnation of the glass in the feeder. According to the present practice in this art, it is customary to rotate the usual plunger or implement which extends into the glass over the outlet and controls the discharge of glass, and it has also been proposed to rotate the container from which the glass is discharged, for the purpose of obtaining such results. The present invention provides a novel method and means for obtaining these results without the need of rotating any of the mechanical parts comprised in the feeder apparatus.

Other objects of the invention will appear hereinafter.

In the accompanying drawing:

Fig. 1 is a sectional elevation of apparatus embodying one form of the invention.

Fig. 2 is a sectional plan view at the line II—II on Fig. 1.

Fig. 3 is a front sectional elevation, the section being taken at the line III—III on Fig. 2.

Referring to the drawing, a furnace tank 10 provides a continuous supply of molten glass 11 to a boot or extension 12 of the main tank. The glass is discharged through a bottom outlet 13, the discharge being controlled in the usual manner by an implement or plunger 14 which projects downward into the glass over the outlet and is periodically reciprocated vertically. The means for reciprocating the plunger, as shown, comprises a continuously rotating cam 15 operating through a lever 16 having a link connection 17 with the plunger. The suspended charges of glass are severed as used by shears 18.

The parts above referred to may be of usual and well known construction. In accordance with the present invention, the channel through which the glass flows from the main tank 10 to the feeder outlet is of a novel shape for a purpose which will presently appear. This channel comprises a comparatively wide portion 19 extending forward from the main furnace and merging into a comparatively narrow channel or throat 20 adjacent the feeder outlet. The throat 20 opens into an enlarged end portion 21 of the channel, which end portion is circular or approximately circular and concentric with the feeder outlet. The circular portion 21 of the channel is of substantially larger diameter than the circular plunger 14 which projects downwardly into and centrally or approximately centrally of said circular portion so that an annular passageway 22 is provided and encircles the plunger. One wall 23 of the channel 19, as shown, extends forward in a straight line from the main furnace and is tangent with the outer circular wall of the channel 22. The opposite wall of the channel 19 comprises a portion 24 curved inwardly to provide the restricted neck 20. The wall 24 may be extended sufficiently close to the plunger to provide a comparatively narrow throat 25 in the annular channel 22.

The opening or passageway 26 extending downward through the floor of the boot to the outlet 13 is formed with curved or tapered walls which at their upper ends merge into the outer wall of the channel 22.

With the construction above set forth, the glass in its passage from the main tank to the feeder outlet, flows forward through the throat 20 into the circular channel 22 and through said channel in a circular or spiral path and downward through the outlet. It will be noted that the throat portion 20 is offset with respect to the central longitudinal axis of the boot 12 and is substantially tangent with the circular channel 22 so that the flow of glass is directed around the plunger 14 as indicated by the arrows. The glass as it advances around the plunger also moves downward toward and through the well 26, resulting in a more or less spiral movement of the glass. It will be seen that with the construction shown, a rotary or spiral circulatory movement is imparted to the glass without rotating either the plunger or other parts of the apparatus. There is thus provided a simple and effective means and method of circulating the glass and directing its flow in a manner to insure homogeneity and uniform temperature throughout the mass of issuing glass. The glass is prevented from becoming cold and stagnant at the front end of the feeder, thus avoiding the formation of dog metal, cold streaks in the issuing glass, and other undesirable conditions due to lack of uniformity of temperature.

Modifications may be resorted to within the spirit and scope of my invention.

What I claim is:

1. Glass feeding apparatus comprising a container for molten glass provided with a bottom outlet opening, and means for supplying glass to the container, said container formed with a spiral passageway through which the glass is directed in a spiral path to the outlet.

2. The combination of a furnace tank, a boot extension having a bottom outlet at its forward end, an implement projecting into the glass over the outlet, said extension shaped to form with the implement an annular channel surrounding the implement, said extension having a channel leading from the furnace to said annular channel and substantially tangent to the latter.

3. The combination of a furnace, a boot extending forward therefrom and provided at its forward end with a bottom outlet opening, said boot shaped to form a channel through which the glass flows from the furnace to said opening, said channel being comparatively wide adjacent the furnace and narrowed to form a throat adjacent the outlet and enlarged beyond said throat to form a circular channel portion substantially concentric with the outlet, said throat being offset laterally with respect to the outlet and tangent with respect to said circular portion.

4. The combination of a furnace, a boot extending forward therefrom and provided at its forward end with a bottom outlet opening, said boot shaped to form a channel through which the glass flows from the furnace to said opening, said channel being comparatively wide adjacent the furnace and narrowed to form a throat adjacent the outlet and enlarged beyond said throat to form a circular channel portion substantially concentric with the outlet, said throat being offset laterally with respect to the outlet and tangent with respect to said circular portion, and an implement projecting downward into the glass over the outlet and forming with the walls of said circular portion an annular channel.

5. The combination of a furnace, a boot extending forward therefrom and provided at its forward end with a bottom outlet opening, said boot shaped to form a channel through which the glass flows from the furnace to said opening, said channel being comparatively wide adjacent the furnace and narrowed to form a throat adjacent the outlet and enlarged beyond said throat to form a circular channel portion substantially concentric with the outlet, said throat being offset laterally with respect to the outlet and tangent with respect to said circular portion, an implement projecting downward into the glass over the outlet and forming with the walls of said circular portion an annular channel, and means for periodically reciprocating said implement.

6. The combination of a furnace, a boot extending forward therefrom and provided at its forward end with a bottom outlet opening, said boot shaped to form a channel through which the glass flows from the furnace to said opening, said channel being comparatively wide adjacent the furnace and narrowed to form a throat adjacent the outlet and enlarged beyond said throat to form a circular channel portion substantially concentric with the outlet, said throat being offset laterally with respect to the outlet and tangent with respect to said circular portion, and an implement projecting downward into the glass over the outlet and forming with the walls of said circular portion an annular channel, the floor of said boot being formed with a well therein having downwardly converging walls terminating at said outlet, the upper portions of said walls merging into the outer walls of said annular channel.

Signed at Toledo, Ohio, this 7th day of October, 1929.

LEONARD D. SOUBIER.